UNITED STATES PATENT OFFICE.

DORA ALICE SMITH, OF GLEN RIDGE, NEW JERSEY.

COMPOSITION OF MATTER FOR CLEANING SILVER.

SPECIFICATION forming part of Letters Patent No. 499,401, dated June 13, 1893.

Application filed October 5, 1892. Serial No. 447,941. (No specimens.)

*To all whom it may concern:*

Be it known that I, DORA ALICE SMITH, a citizen of the United States, residing at Glen Ridge, in the county of Essex and State of New Jersey, have invented a certain new and useful Composition of Matter for Cleaning Silver and other Metals; and I do hereby declare the following to be a full, clear, and exact description of the invention, such as will enable others skilled in the art to which it appertains to make and use the same.

My composition or compound consists of the following ingredients, combined in the proportions substantially as stated, viz:—water, one pint and a half; ammonia, one gill; kerosene oil, one teaspoonful; oil of bergamot, one tablespoonful; whiting, one-quarter pound; bituminous or cannel coal-ashes, two ounces. These ingredients are to be thoroughly mixed by agitation.

In using the above-named compound it should first be well shaken and then applied with a woolen cloth, after which rub gently with a dry piece of flannel or woolen cloth. The result will be to impart to the metal a very fine and durable polish.

What I claim, and desire to secure by Letters Patent of the United States, is—

1. The herein-described composition of matter to be used for polishing silver and other metals, consisting of water, ammonia, kerosene oil, whiting and bituminous coal-ashes, and oil of bergamot substantially in the proportions specified.

2. The herein described compound for cleaning silver, composed of whiting, ammonia, kerosene oil, coal-ashes and water, substantially as specified.

In testimony that I claim the foregoing I have hereunto set my hand this 1st day of October, 1892.

DORA ALICE SMITH.

Witnesses:
OLIVER DRAKE,
OSCAR A. MICHEL.